US009787873B2

(12) United States Patent
Igawa et al.

(10) Patent No.: US 9,787,873 B2
(45) Date of Patent: Oct. 10, 2017

(54) HALFTONE DOT SCREEN GENERATION WITH CONDITIONAL ARRANGEMENT OF GROWTH CENTERS TO FORM DOT BLOCKS AND BRIDGES CONNECTING ADJACENT DOT BLOCKS

(71) Applicants: Hiroyuki Igawa, Kanagawa (JP); Hideki Kamaji, Kanagawa (JP)

(72) Inventors: Hiroyuki Igawa, Kanagawa (JP); Hideki Kamaji, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/198,421

(22) Filed: Jun. 30, 2016

(65) Prior Publication Data

US 2017/0013171 A1  Jan. 12, 2017

(30) Foreign Application Priority Data

Jul. 7, 2015  (JP) .................................. 2015-136134
May 27, 2016  (JP) .................................. 2016-106463

(51) Int. Cl.
*H04N 1/405* (2006.01)
*H04N 1/409* (2006.01)
*G06K 15/02* (2006.01)
*H04N 1/52* (2006.01)
*H04N 1/58* (2006.01)
*G06K 15/14* (2006.01)
(Continued)

(52) U.S. Cl.
CPC ....... *H04N 1/4056* (2013.01); *G06K 15/1881* (2013.01); *H04N 1/409* (2013.01); *H04N 1/4051* (2013.01); *G03G 15/01* (2013.01); *G03G 15/04027* (2013.01); *G06K 15/14* (2013.01); *H04N 1/52* (2013.01); *H04N 1/58* (2013.01); *H04N 2201/0094* (2013.01)

(58) Field of Classification Search
CPC .......................... H04N 1/4055; H04N 1/4056
See application file for complete search history.

(56) References Cited

U.S. PATENT DOCUMENTS 5,258,850 A * 11/1993 Tai ........................ H04N 1/4057
    358/3.15
6,714,225 B2 * 3/2004 Mutou ................. H04N 1/4055
    347/131
(Continued)

FOREIGN PATENT DOCUMENTS

JP    2012-003180    1/2012
JP    2016-034128    3/2016
JP    2016-111667    6/2016

*Primary Examiner* — Scott A Rogers
(74) *Attorney, Agent, or Firm* — Harness, Dickey & Pierce, P.L.C.

(57) ABSTRACT

An image processing apparatus includes: an image determining unit configured to determine a gradation value for each predetermined range in input image data; and a screen generator configured to arrange dot images around a plurality of growth centers in a halftone dot screen to form respective dot blocks if an input area rate indicating a ratio of black to white in dot images at the gradation value is smaller than a value at which an image defect occurs, and form bridges to connect adjacent dot blocks during a smallest gradation number if distances between the adjacent dot blocks decrease to a predetermined value or less along with growth of the dot blocks, to form a void halftone dot image.

11 Claims, 18 Drawing Sheets

DOT BLOCK
db dc
GROWTH CENTER

BRIDGE
dk

VOID HALFTONE
DOT PORTION
ws

(51) Int. Cl.
*G03G 15/01* (2006.01)
*G03G 15/04* (2006.01)

(56) References Cited

U.S. PATENT DOCUMENTS

| | | | | |
|---|---|---|---|---|
| 7,009,729 | B2* | 3/2006 | Fujita | H04N 1/4058 358/1.16 |
| 8,149,464 | B2* | 4/2012 | Kim | H04N 1/4055 358/3.06 |
| 2007/0236738 | A1* | 10/2007 | Hara | H04N 1/4051 358/3.02 |
| 2014/0226187 | A1* | 8/2014 | Sagimori | G06K 15/1876 358/3.13 |
| 2016/0034794 | A1 | 2/2016 | Igawa et al. | |
| 2016/0155031 | A1 | 6/2016 | Igawa et al. | |

* cited by examiner

EXAMPLE OF DOT GROWTH IN HALFTONE DOT SHAPE

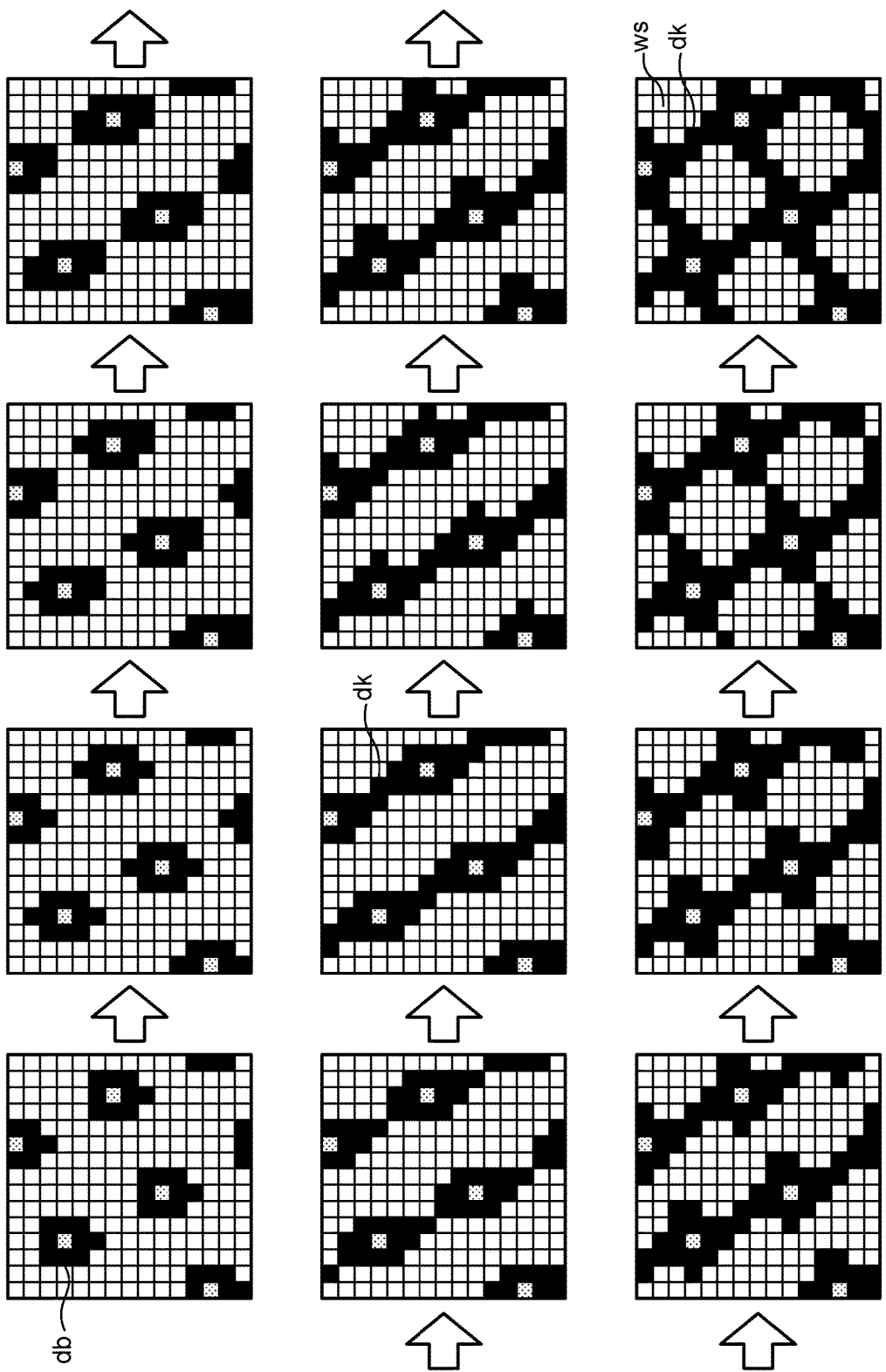

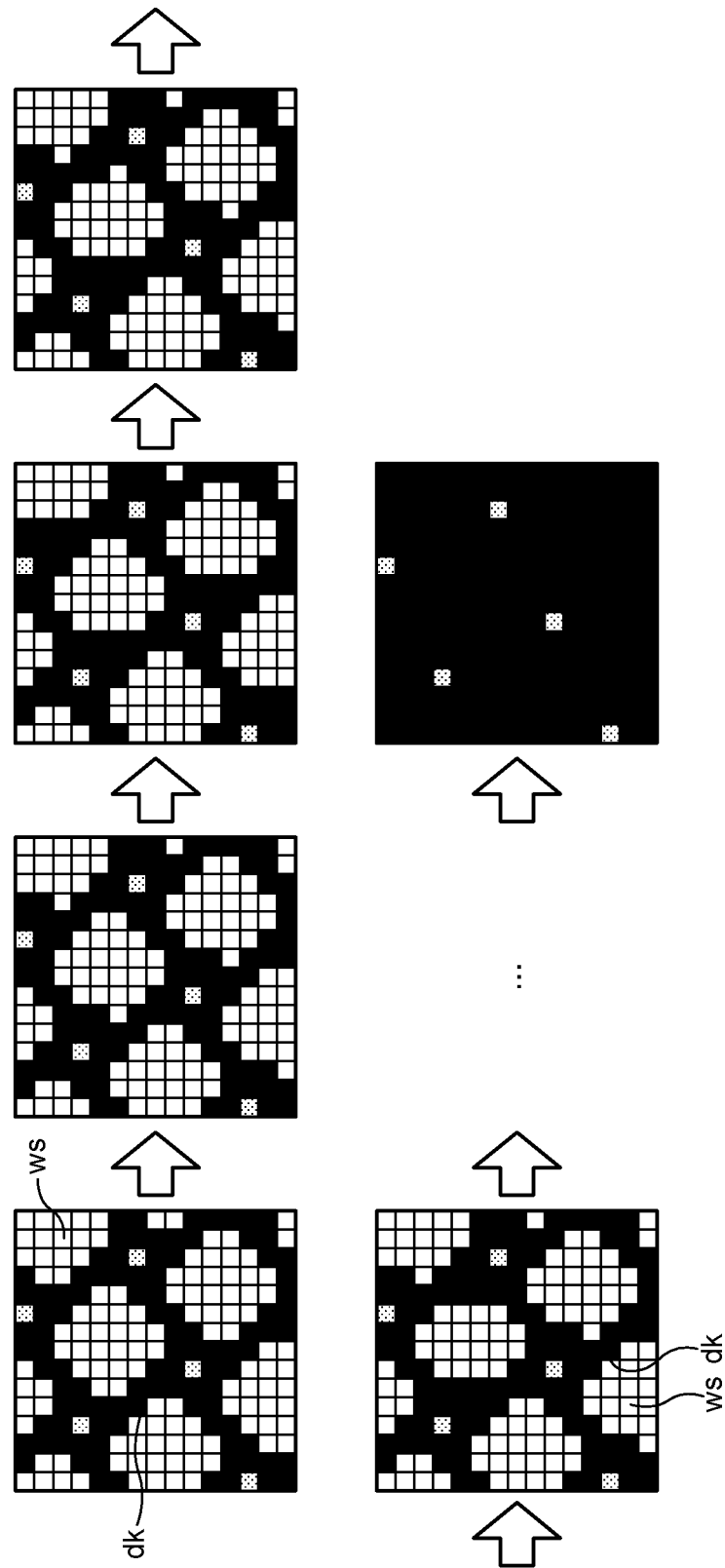

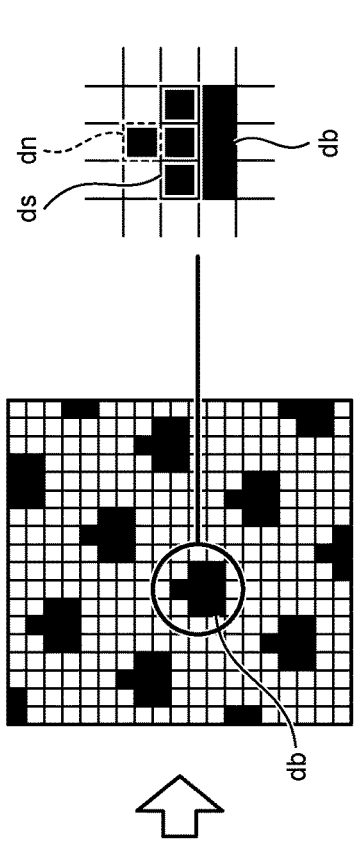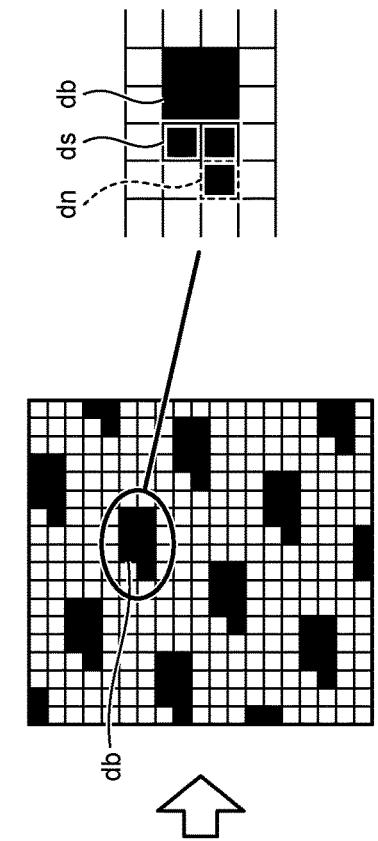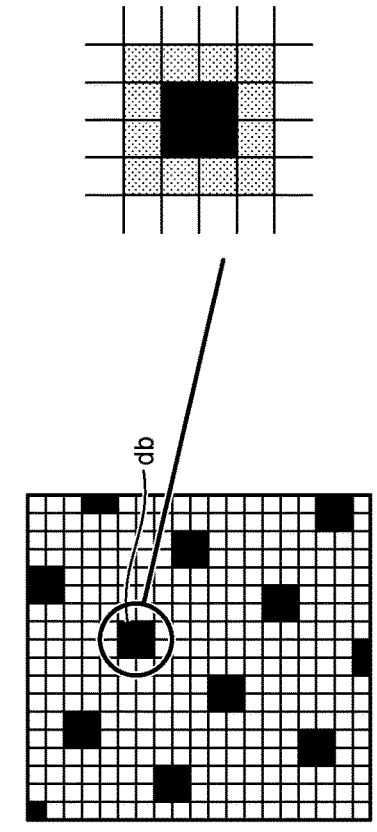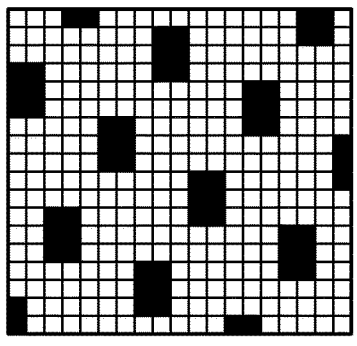
FIG.8A  <GOOD EXAMPLE>
FIG.8B  <BAD EXAMPLE>
FIG.8C  <EXAMPLE OF EXCEPTION>

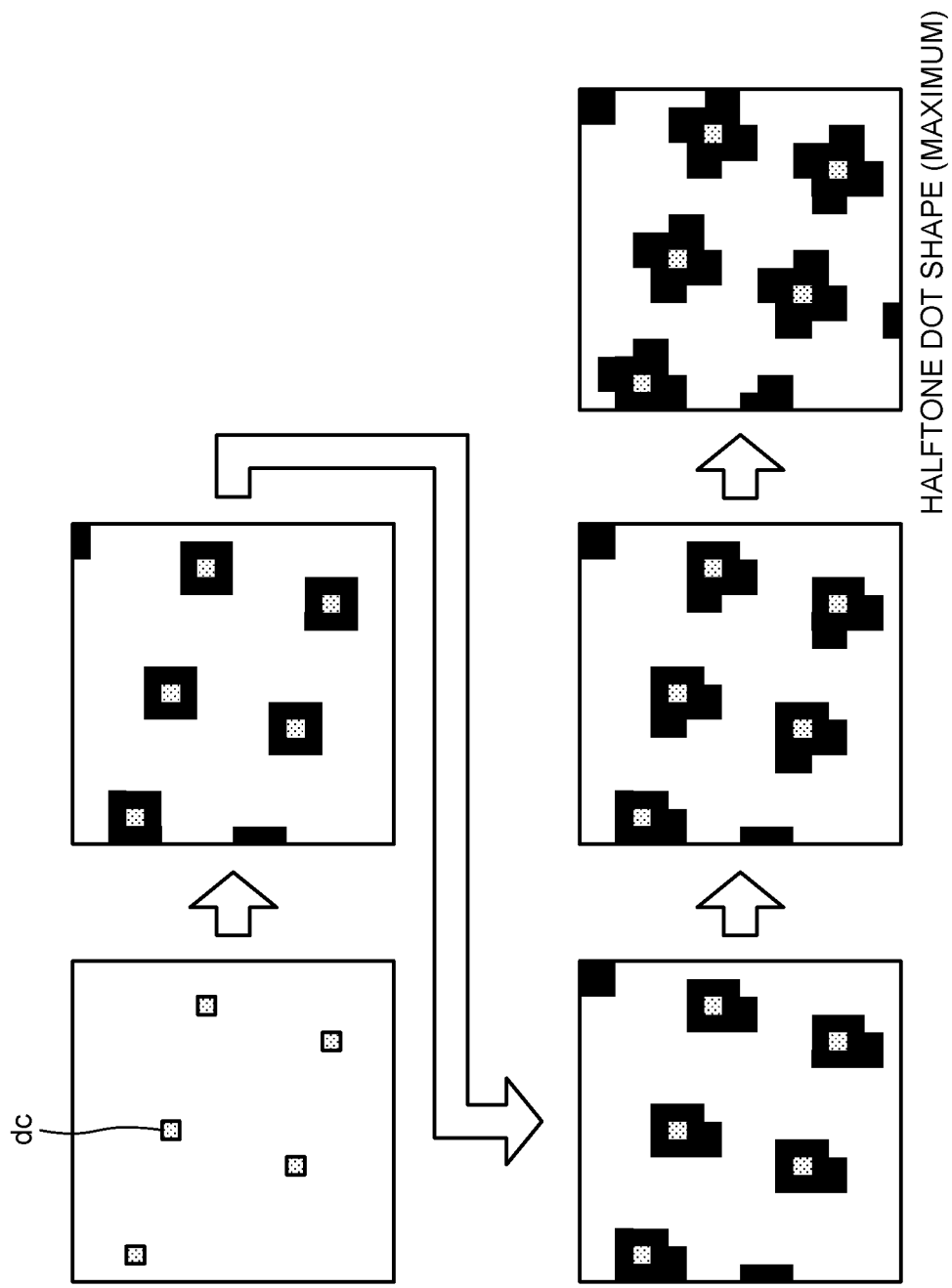

HALFTONE DOT SHAPE AND SCREEN ANGLE (a) → (b)

HALFTONE DOT SCREEN GENERATION WITH CONDITIONAL ARRANGEMENT OF GROWTH CENTERS TO FORM DOT BLOCKS AND BRIDGES CONNECTING ADJACENT DOT BLOCKS

CROSS-REFERENCE TO RELATED APPLICATIONS

The present application claims priority under 35 U.S.C. §119 to Japanese Patent Application No. 2015-136134, filed Jul. 7, 2015 and Japanese Patent Application No. 2016-106463, filed May 27, 2016. The contents of which are incorporated herein by reference in their entirety.

BACKGROUND OF THE INVENTION

1. Field of the Invention

The present invention relates to an image processing apparatus, an image processing method, and a recording medium.

2. Description of the Related Art

Conventionally, electrophotography is generally inferior to offset printing in image stability. To bring the image stability in electrophotography close to the image stability in offset printing, various techniques have been employed. One of differences between electrophotography and offset printing is gradation expression. Electrophotography performs image processing using a line screen, a halftone dot screen, or an FM screen, for example, to express gradation. The halftone dot screen outputs an image having gradation close to gradation in offset printing compared with other screens.

Japanese Unexamined Patent Application Publication No. 2012-3180, for example, discloses a technique of using two types of screens to provide high image quality and a high degree of stability of the image quality in intermediate gradation, which are less likely to be provided by the halftone dot screen. Specifically, the technique employs two types of screens, a line screen in low-to-intermediate gradation and a void halftone dot screen (screen with dots that looks like a screen obtained by inverting a halftone dot screen) in high gradation.

The conventional technique, however, does not take into consideration a method for improving the image quality and securing the stability of the image quality in intermediate-to-high gradation where the screens are switched. As a result, the image quality and the stability may possibly deteriorate near this gradation. Furthermore, the conventional technique needs to store the two screens and perform rearrangement of dots in each dot array at an adjacent portion of the two different screens. As a result, the technique is expected to require a longer time to perform the image processing and requires a larger capacity memory than in other conventional techniques using one screen. The conventional halftone dot screen thus has a low degree of stability of the image quality in the intermediate gradation.

SUMMARY OF THE INVENTION

According to one aspect of the present invention, an image processing apparatus includes an image determining unit and a screen generator. The image determining unit is configured to determine a gradation value for each predetermined range in input image data. The screen generator is configured to arrange dot images around a plurality of growth centers in a halftone dot screen to form respective dot blocks if an input area rate indicating a ratio of black to white in dot images at the gradation value is smaller than a value at which an image defect occurs, and form bridges to connect adjacent dot blocks during a smallest gradation number if distances between the adjacent dot blocks decrease to a predetermined value or less along with growth of the dot blocks, to form a void halftone dot image.

BRIEF DESCRIPTION OF THE DRAWINGS

FIG. 2B is a diagram for explaining an example of dot growth in shifting from the halftone dot shape to a void halftone dot shape;

FIG. 2C is a diagram for explaining an example of dot growth in the void halftone dot shape;

FIGS. 8A to 8C are diagrams for explaining an example of processing for dot growth according to the present embodiment;

FIG. 9 is a diagram for explaining an example of a method for growing dots according to the present embodiment until the distance between dots decreases to 50 μm or less;

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
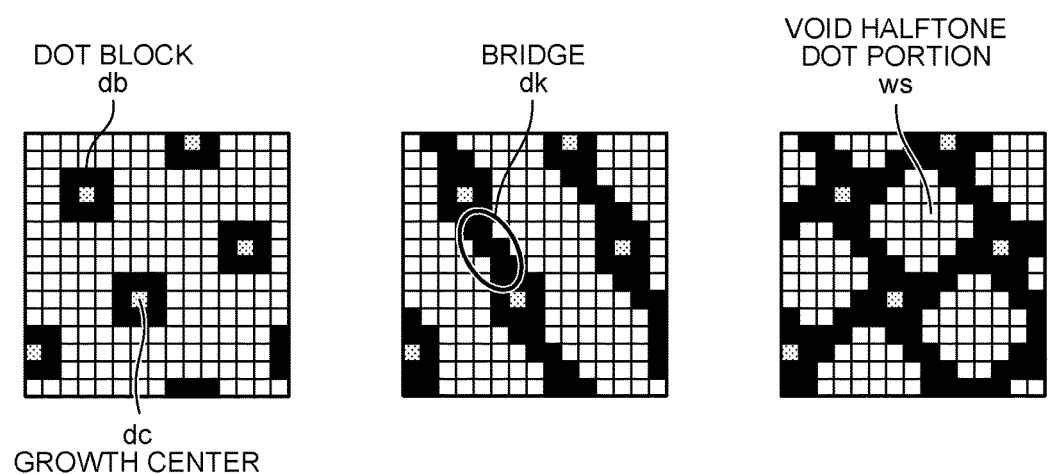
FIG. 1 is a diagram for explaining terms of a screen image according to an embodiment of the present invention.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Exemplary embodiments of an image processing apparatus, an image processing method, and a recording medium according to the present invention are described below in greater detail with reference to the accompanying drawings.

An embodiment has an object to improve the image stability of a halftone dot screen in intermediate gradation.

Embodiments

Method for Growing Dots in a Halftone Dot Screen

Failure in Dot Growth in a Halftone Dot Screen

A method for growing dots in a halftone dot screen is described first. In image formation using an electrophotographic technology, ends of exposure distributions of adjacent dot blocks overlap with each other when the distance between the dot blocks is small. As a result, a certain magnitude of exposure intensity is generated at a non-image portion (base portion). The generated exposure intensity generates, on a photoconductor immediately after being charged, a minute latent image potential that causes toner to adhere to the photoconductor.

Figure 18:
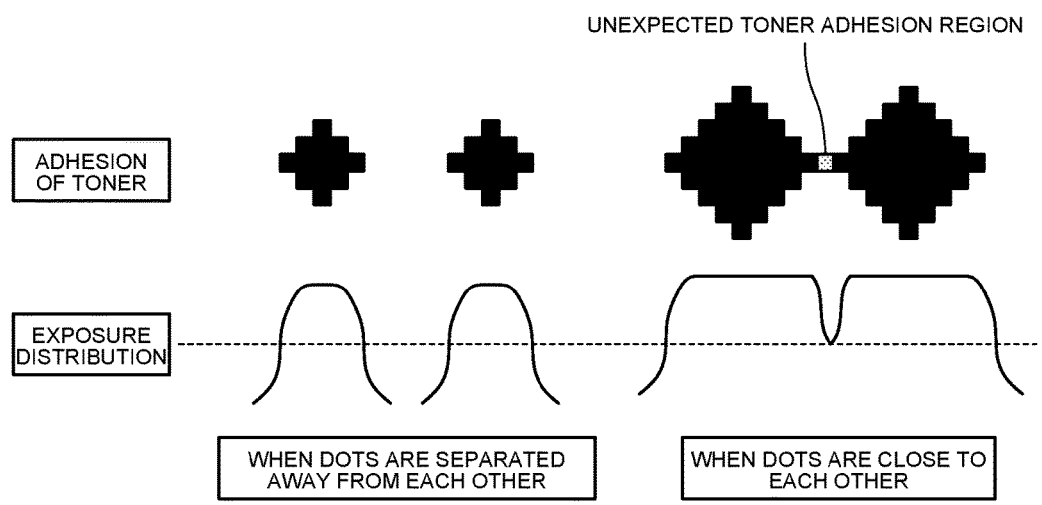
FIG. 18 is a diagram for explaining a relation between the distance between dots and an unstable toner adhesion region.

In this case, as illustrated in FIG. 18, toner adheres to a position not supposed to be provided with toner. In other words, toner adheres to a position (a non-adhesion region or a base portion) other than the positions on which an image is originally formed. This phenomenon is more likely to occur as the distance between dot blocks of a received image is smaller (refer to dl in FIG. 20, which will be described later). Because of the instability specific to electrophotography, toner may possibly sometimes adhere and sometimes not to a position not supposed to be provided with toner in a specific distance between the dot blocks. As a result, the image quality deteriorates.

The following describes a conventional method for growing a halftone dot screen. Growth of a halftone dot screen is image processing for changing the size of dot images so as to change the ratio of white to black to express halftone (intermediate gradation) in a pseudo manner. Growth of dot images and formation of dot images indicate the same meaning and are appropriately referred to as "formation" or "growth".

Figure 19:
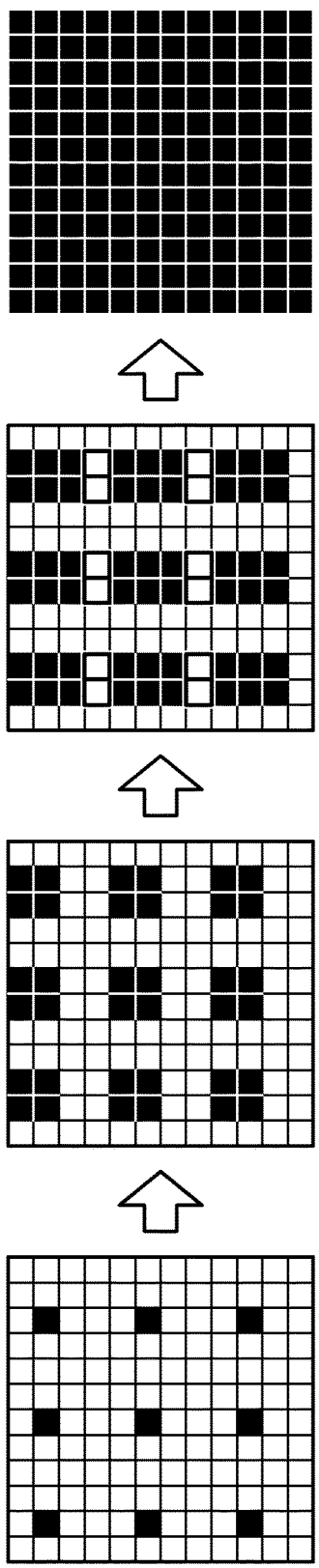
FIG. 19 is a diagram for explaining a conventional method for growing a halftone dot screen.

FIG. 19 is a diagram for explaining the conventional method for growing a halftone dot screen. As illustrated in FIG. 19, dot images are written in the halftone dot screen in order of growth of the dot images (as the image density is increased). The dot images are grown in order from a dot image closer to a dot image serving as a pixel of one dot called a growth center (corresponding to a dot formation center) to peripheral dot images.

As illustrated in FIG. 19, the conventional method for growing a halftone dot screen increases the size of the formed dot images from the growth center of the dot images to expresses gradation. In the conventional method for growing a halftone dot screen, the distance between dot blocks decreases as the gradation value increases. As a result, adhesion of toner becomes unstable, thereby making deterioration of the image quality more likely to occur in the intermediate gradation. To improve the image stability in the halftone dot screen in the intermediate gradation, it is necessary to change the method for growing the dot images.

Figure 20:
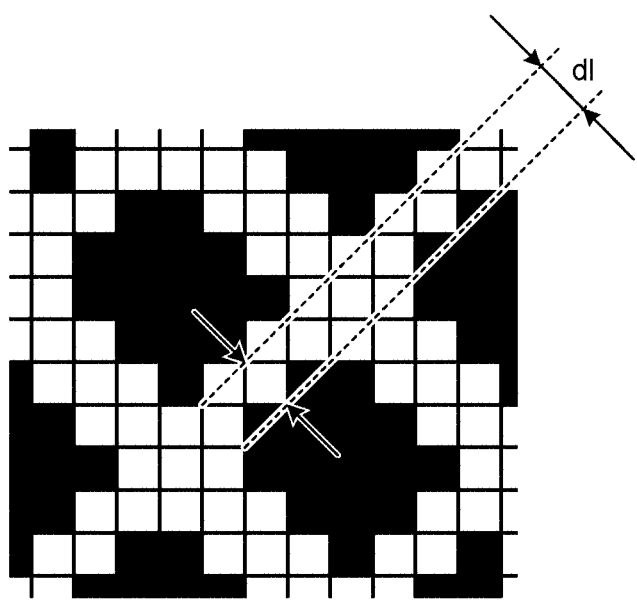
FIG. 20 is a diagram for explaining the distance between dots when an input area rate is 50%.

In the conventional method for growing a halftone dot screen, any method for growing dots has a gradation in which the distance between dot blocks decreases and the image stability deteriorates. However, the order of growth of dots can be devised. In the conventional method for growing a halftone dot screen, many gradations have a distance between dots that deteriorates the image stability in non-toner adhesion portions in the intermediate gradation. As a result, the conventional method has a low degree of image stability in the intermediate gradation. It is known that the image quality frequently deteriorates when the distance dl between dot blocks decreases to 50 μm or less as illustrated in FIG. 20.

In the halftone dot screen, a decrease in the distance between dot blocks makes adhesion of toner unstable, thereby deteriorating the image quality and the stability of the image quality. This phenomenon occurs at an input area rate of substantially 50% at which the distance dl between dot blocks falls below 50 μm.

Exemplary Outline of Halftone Dot Screen Processing According to an Embodiment

To eliminate the failure in a halftone dot screen, halftone dot screen processing described below is performed, thereby improving the image quality and the stability of the image quality in the halftone dot screen (refer to FIGS. 2A to 2C). A specific example is described below. In the drawings illustrating images referred to in the present description, one square corresponds to an image of one dot (pixel).

The following describes terms of a screen image according to an embodiment of the present invention with reference to FIG. 1. In FIG. 1, dc denotes a growth center of dot images, db denotes a dot block including dot images surrounding the growth center dc, dk denotes a bridge that connects the dot block db to be processed to an adjacent dot block db with a bridge structure, and ws denotes a void halftone dot portion surrounded by the bridges dk.

Figure 2A:
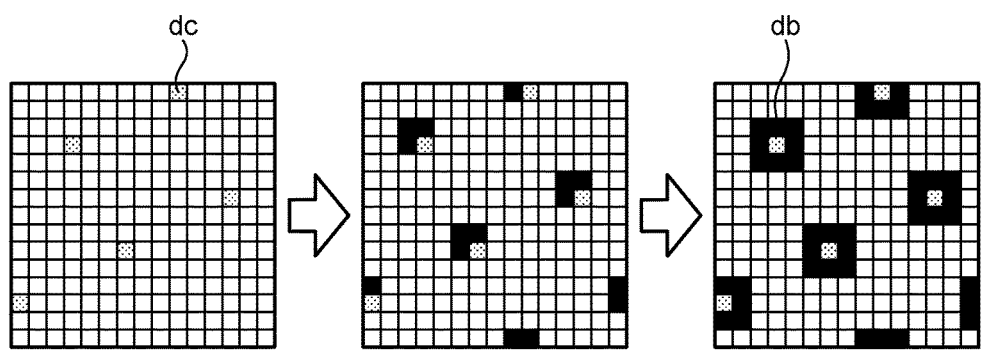
FIG. 2A is a diagram for explaining an example of dot formation in a halftone dot shape.

FIG. 2A is a diagram for explaining an example of dot formation in a halftone dot shape. Dot images are formed around the growth centers dc illustrated in the left figure in FIG. 2A and thus the dot blocks db illustrated in the right figure in FIG. 2A is formed to perform the processing for growing (forming) dot images.

FIG. 2B is a diagram for explaining an example of dot growth processing in shifting from the halftone dot shape illustrated in FIG. 2A to a void halftone dot shape. As illustrated in FIG. 2B, the bridges dk are formed to connect the dot blocks db on which dot image growth processing is performed as illustrated in FIG. 2A, thereby forming the void halftone dot portions ws.

FIG. 2C is a diagram for explaining an example of processing for growing (forming) dots from the void halftone dot shape illustrated in FIG. 2B. As illustrated in FIG. 2C, dot images are formed in order in a manner filling the void halftone dot portions ws processed as illustrated in FIG. 2B, thereby forming a solid image.

Example of the System Configuration

The following describes a system configuration and an example of operations for performing the halftone dot screen processing according to the embodiment above.

Figure 3:
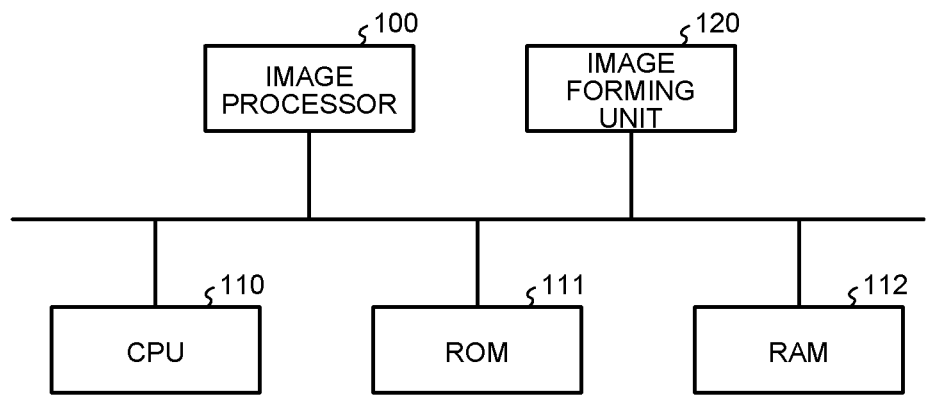
FIG. 3 is a block diagram of a system configuration of an image forming apparatus according to the present embodiment.

FIG. 3 is a block diagram illustrating a system structure of an image forming apparatus according to the present embodiment. The image forming apparatus is a copier, a printer such as a laser printer, a facsimile, or a multifunction peripheral that includes at least one or more of copying, printing, and facsimile functions, for example. The image forming apparatus may output a single color or a color obtained by combination of types of toner of yellow (Y), magenta (M), cyan (C), and black (K). The image forming apparatus includes an image processor 100, a central processing unit (CPU) 110, a read only memory (ROM) 111, a random access memory (RAM) 112, and an image forming unit 120.

Figure 4:
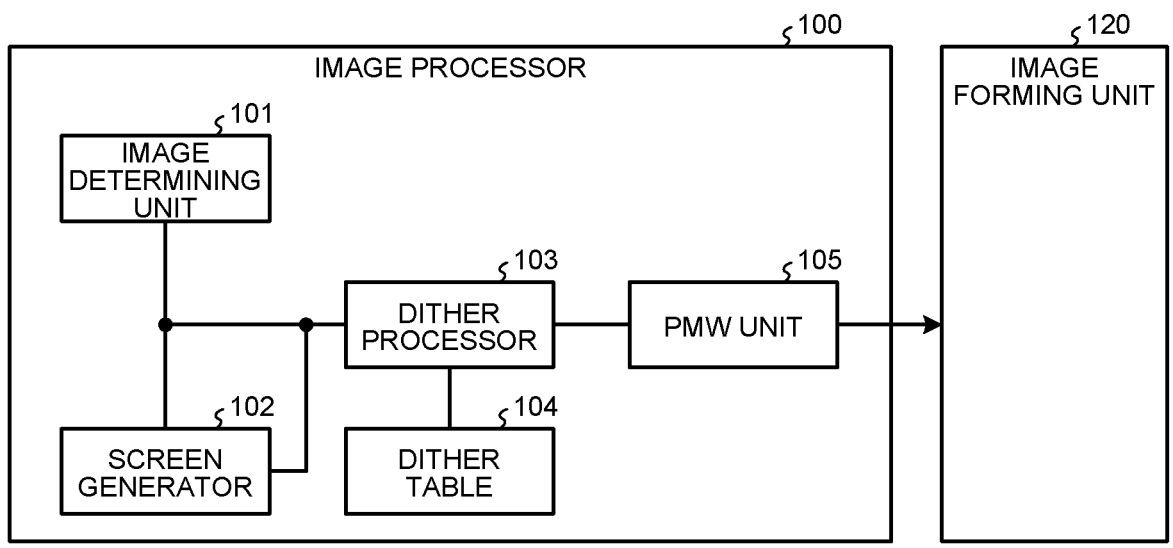
FIG. 4 is a block diagram of a configuration including functions of an image processor.

The image processor 100, which is mounted on a controller board of the image forming apparatus, for example, performs the predetermined image processing on received image data and outputs the processed image data to the image forming unit 120. The image processor 100 has a structure as illustrated in FIG. 4, which is described later, for example. In the image forming apparatus, the CPU 110 performs a certain control operation, which is described later, in accordance with a control program stored in the ROM 111 using the RAM 112 as a working memory.

In a case where the image forming apparatus according to the present embodiment is a laser printer, the image forming unit 120 includes an optical writing unit including a laser optical system and a writing controller. Based on image signals transmitted from the image processor 100, the image forming unit 120 exposes the surface of the photoconductor charged by laser modulation. The exposure forms a latent image of dot images on the charged photoconductor. Subsequently, the image forming unit 120 performs a process of developing, transfer, and fixing, which are known as a process of a typical electrophotographic apparatus, thereby forming a desired image on a recording sheet.

FIG. 4 is a block diagram illustrating the functional structure of the image processor 100. The image processor 100 includes an image determining unit 101, a screen generator 102, a dither processor 103, a dither table 104, and a PMW unit 105.

The image determining unit 101 determines a gradation value for each certain range in the received image data. The image determining unit 101 reads, from the received image data, image information (gradation value) in a half tone region (intermediate gradation region).

The screen generator 102 forms dot images around a plurality of growth centers dc in a halftone dot screen to form the dot blocks db when the input area rate indicating the ratio of black to white of dot images at a gradation value is smaller than a value at which an image defect occurs. Subsequently, when the distance between adjacent dot blocks db decreases to a predetermined value or less along with the growth of the dot blocks db, the screen generator 102 forms the bridges dk during the smallest gradation number. The screen generator 102 thus connects the adjacent dot blocks db, thereby forming the void halftone dot portions ws. A specific example of the screen generator 102 will be described later in detail.

The dither processor 103 determines, from the received image information, the dither pattern to be applied, reads dither pattern data stored in the dither table 104, and performs the dither processing in accordance with the read dither pattern data. The dither table 104, which includes a plurality of pieces of dither pattern data, is stored in a storage device such as an HDD.

The PMW unit 105 performs pulse width modulation (PMW) on the basis of the image data after the dither processing by the dither processor 103 when the image forming unit 120 is a laser printer. The PMW unit 105, then, sends a signal to an optical writer (not illustrated) of the image forming unit 120 to modulate a laser diode (LD).

A part or the whole of the function of the image processor 100 may be achieved by software or hardware.

Figure 5:
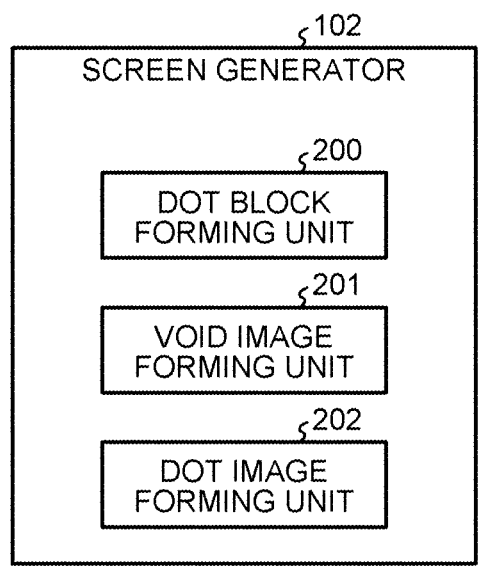
FIG. 5 is a block diagram of a functional configuration of a screen generator.

FIG. 5 is a block diagram illustrating a functional structure of the screen generator 102. The screen generator 102 includes a dot block forming unit 200, a void image forming unit 201, and a dot image forming unit 202. These functional units are described later.

A part or the whole of the function of the screen generator 102 may be achieved by software or hardware.

The screen generator 102 according to the present embodiment improves the stability of the image quality in the intermediate gradation as described below.

When adding a new dot image in contact with a dot block db, the dot block forming unit 200 forms the dot block db such that the new dot image is in contact with a predetermined number or more of dots of the dot block db in all the directions around the dot image. When the dot blocks db are grown by the dot block forming unit 200, and the distance between adjacent dot blocks db decreases to the predetermined value or less, the void image forming unit 201 forms the bridges dk during the smallest gradation number to connect the adjacent dot blocks db, thereby forming the void halftone dot portions ws. After the formation of the void halftone dot portions ws is completed, the dot image forming unit 202 fills void portions included in the void halftone dot portions ws with dot images. A specific example of these functions will be described later.

The predetermined value of the distance between the dot blocks db is 50 μm, for example.

The void image forming unit 201 forms the void halftone dot portions ws such that the gradation number during which protrusions of the void halftone dot portions ws have a minor axis of 50 μm is smallest.

In the halftone dot screen, the predetermined value of the distance between the dot blocks db is 50 μm, the input area rate is equal to or lower than 40%, and the void halftone dot portions ws accounts for equal to or more than 40%.

When forming the bridges dk in the halftone dot screen to form the void halftone dot portions ws, the void image forming unit 201 forms the bridges dk in a direction having a larger screen angle first.

Figure 6:
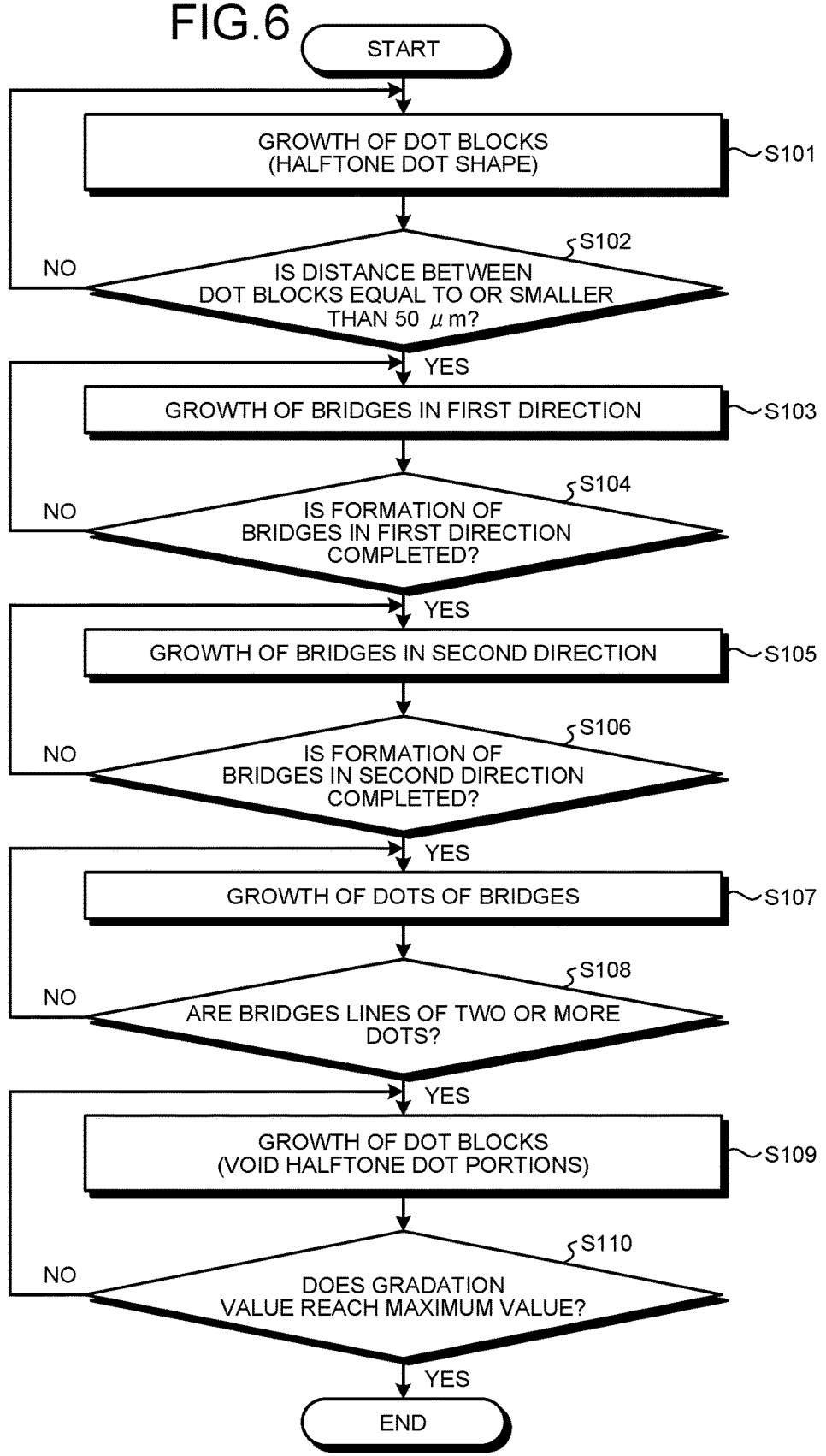
FIG. 6 is a flowchart of an example of screen processing according to the present embodiment.

FIG. 6 is a flowchart of an example of screen processing according to the present embodiment. The processing is performed by the screen generator 102 illustrated in FIGS. 4 and 5. An example of the screen processing is illustrated in FIGS. 1 and 2A to 2C, for example.

The dot block forming unit 200 grows the dot blocks db based on the gradation value of a received image in the same manner as in a typical halftone dot screen (Step S101). Subsequently, the dot block forming unit 200 determines whether the distance dl between the dot blocks db is equal to or smaller than 50 µm in the process of dot growth (Step S102). If the distance dl between the dot blocks db is not equal to or smaller than 50 µm (No at Step S102), the dot block forming unit 200 performs the processing at Step S101 again. By contrast, if the distance dl between the dot blocks db exceeds 50 µm at Step S102, (Yes at Step S102), the process proceeds to Step S103. As described above, the dot block forming unit 200 grows the dot blocks db in the same manner as in the conventional halftone dot screen until the distance dl between the dot blocks db decreases to 50 µm, for example.

Subsequently, the void image forming unit 201 grows dot blocks db serving as bridges dk in a first direction to form the void halftone dot portions ws from the halftone dot shape (Step S103). Subsequently, the void image forming unit 201 determines whether the formation of the bridges dk in the first direction is completed (Step S104). If the formation of the bridges dk in the first direction is not completed (No at Step S104), the void image forming unit 201 performs the processing at Step S103 again. By contrast, if the formation of the bridges dk in the first direction is completed at Step S104 (Yes at Step S104), the void image forming unit 201 grows dot blocks db serving as bridges dk in a second direction to form the void halftone dot portions ws from the halftone dot shape (Step S105).

Subsequently, the void image forming unit 201 determines whether the formation of the bridges dk in the second direction is completed (Step S106). If the formation of the bridges dk in the second direction is not completed (No at Step S106), the void image forming unit 201 performs the processing at Step S105 again. By contrast, if the formation of the bridges dk in the second direction is completed at Step S106 (Yes at Step S106), the void image forming unit 201 performs processing at Step S107. In other words, the void image forming unit 201 grows the dot blocks db serving as the bridges dk in the second direction to form the void halftone dot portions ws from the halftone dot shape at Step S105. Subsequently, the void image forming unit 201 grows the dot blocks db serving as the bridges dk until adjacent dot blocks db are connected at Step S106, thereby forming the void halftone dot portions ws. As described above, the void image forming unit 201 grows the dot blocks db serving as the bridges dk until adjacent dot blocks db are connected.

Subsequently, the void image forming unit 201 grows the dot images of the bridges dk (Step S107) and determines whether the bridges dk in the two directions serving as the circumference of the void halftone dot portions ws are lines with a width of two or more dots (Step S108). If the bridges dk in the two directions are not lines with a width of two or more dots (No at Step S108), the void image forming unit 201 performs the processing at Step S107 again. By contrast, if the bridges dk in the two directions are lines with a width of two or more dots (Yes at Step S108), the void image forming unit 201 performs processing at Step S109.

In other words, if the bridges dk in the two directions serving as the circumference of the void halftone dot portions ws includes a line with a width less than two dots at Step S108, the void image forming unit 201 performs the processing at Step S107 again to grow the dot blocks db such that the bridges dk are lines with a width of two or more dots.

Subsequently, the void image forming unit 201 grows the dot blocks db so as to reduce minute protrusions as much as possible in the void halftone dot portions ws formed by forming the bridges dk (Step S109). Subsequently, the void image forming unit 201 determines whether the gradation value reaches the maximum in the void halftone dot portions ws (Step S110). If the gradation value is not the maximum value (No at Step S110), the void image forming unit 201 performs the processing at Step S109 again. By contrast, if the gradation value reaches the maximum value in the void halftone dot portions ws by the void image forming unit 201 (Yes at Step S110), the dot image forming unit 202 grows the dot blocks db until the dot blocks fill the void halftone dot portions ws to form a sold image.

Figure 7:
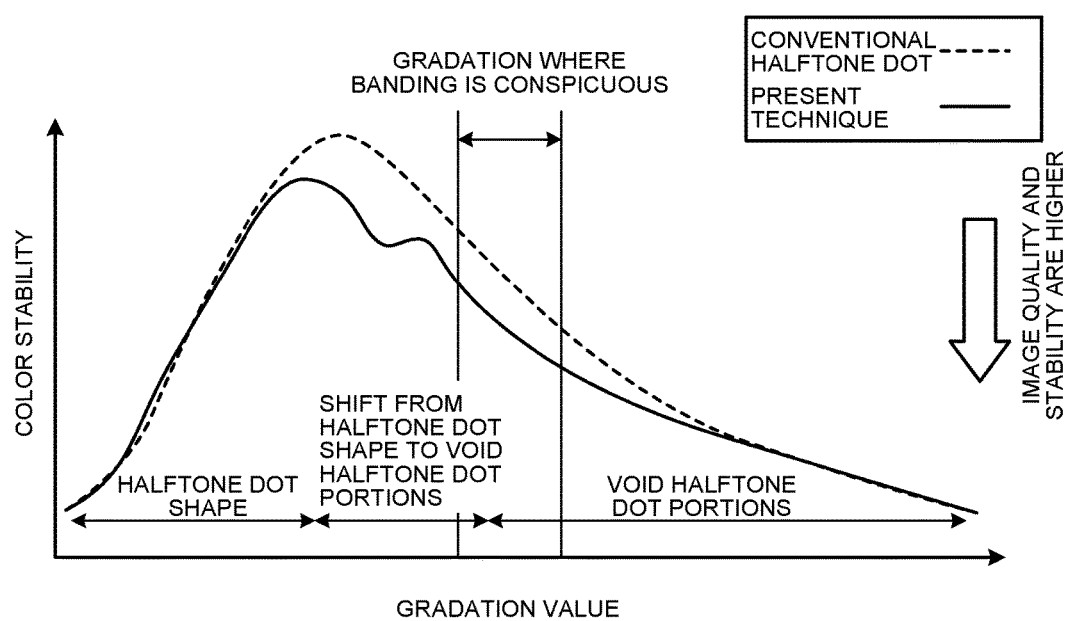
FIG. 7 is a graph of image stability in conventional halftone dot screen processing and halftone dot screen processing according to the present embodiment.

The following describes the screen processing according to the present embodiment in greater detail. FIG. 7 is a graph of the image quality and the stability thereof in the screen processing according to the present embodiment. FIG. 7 illustrates the image stability in the conventional halftone dot screen processing and the halftone dot screen processing according to the present embodiment.

In FIG. 7, the horizontal axis represents the gradation value, and the vertical axis represents the color stability (ranging from good to bad). As illustrated in FIG. 7, the conventional halftone dot screen processing (graph indicated by the broken line) has a problem in the color stability in the intermediate gradation. Because the gradation in which the color stability is worse overlaps with the gradation in which banding is conspicuous, the degree of banding deteriorates. In FIG. 7, a region near the right side of the vertex of the parabola in the graph corresponds to a region in which banding is conspicuous. Banding is belt-like density unevenness appearing in a halftone region (intermediate gradation region) of an image. In other words, banding is an abnormal image known as belt-like density unevenness appearing in a halftone region of an image.

By contrast, the processing performed by the screen generator 102 according to the present embodiment corresponds to the graph indicated by the solid line in FIG. 7. As indicated by the graph, the processing includes the following three image processing functions: formation of the halftone dot shape, shift from the halftone dot shape to the void halftone dot portions ws, and formation of the void halftone dot portions ws. As illustrated in FIG. 7, these image processing functions can solve the problem described above.

As described above, the dot block forming unit 200 grows the halftone dot shape until the distance between the dot blocks db decreases to 50 µm. When the distance between the dot blocks db decreases to 50 µm, for example, the void image forming unit 201 starts to form the void halftone dot portions ws. The void image forming unit 201 forms the void halftone dot portions ws using the bridge structure in two types of directions. The void image forming unit 201 finishes forming the void halftone dot portions ws before the input area rate reaches 40%. After the formation of the void halftone dot portions ws is completed, the dot image forming unit 202 grows the dot blocks db so as to fill the void halftone dot portions ws.

As described above, the shape of the screen according to the present embodiment is grown by the following process (refer to FIGS. 2A to 2C). The screen processing according to the present embodiment includes the following processing process in the order of dot growth performed by the void image forming unit 201, thereby improving the image quality and the stability of the image quality.

(1) Growth in the halftone dot shape
(2) Shift from the halftone dot shape to the void halftone dot shape (formation of the first bridges dk)
(3) Shift from the halftone dot shape to the void halftone dot shape (formation of the second bridges dk)
(4) Growth in the void halftone dot shape The screen processing should be performed while observing the order of dot growth in the bridge structure to form the void halftone dot portions ws. Adhesion of toner is made unstable just before the bridge structure is completed because the distance between the dot blocks db is small. To improve the image quality and the stability of the image quality, it is necessary to connect half-connected bridges dk as quickly as possible. In the void halftone dot portions ws, adhesion of toner is likely to be unstable at the protrusions in the circumference having a smaller distance between the dot blocks db. In the order of dot growth in the bridges dk and the void halftone dot portions ws, and especially in dot growth in the bridges dk, the bridges dk are connected during the smallest gradation value when the distance between the dot blocks db decreases to 50 μm or less in the bridge structure extending from the adjacent dot blocks db. In the growth process of the dot blocks db in the void halftone dot portions ws, the dots are grown such that the gradation number during which the protrusions have a minor axis of 50 μm is smallest.

As described above, a decrease in the distance between the dot blocks db makes adhesion of toner unstable in the halftone dot screen, thereby deteriorating the image quality and the stability of the image quality. This phenomenon occurs at an input area rate of 50% at which the distance between the dot blocks db falls below 50 μm. The screen generator 102 performs the processing described with reference to FIGS. 2A to 2C, thereby improving the image quality and the stability of the image quality in the halftone dot screen.

As illustrated in FIG. 7, the halftone dot screen according to the present embodiment has two gradation regions having a low degree of toner adhesion stability. The first region corresponds to a timing just before the first bridges dk are connected, and the second region corresponds to a timing just before the second bridges dk are connected. This is because the timing just before the bridges dk are completed is a timing when the distance between the dot blocks db is small, thereby deteriorating the toner adhesion stability. Banding is one of abnormal images in electrophotography. As described above, banding is belt-like density unevenness appearing in a halftone region of an image and is most conspicuous when the input area rate indicating the ratio of black to white of dot images at a gradation value is substantially 50%. The screen generator 102 determines the gradation number to start to form the bridges dk and the gradation number required for the bridges dk so as to prevent the two gradation regions in which the bridges dk are connected from overlapping with the region in which banding is conspicuous. This function can reduce occurrence of banding and improve the image quality and the stability of the image quality at the intermediate gradation value.

The following describes a specific example of the functional units with reference to the drawings. The present embodiment uses a void dot shape that looks like a shape obtained by inverting a dot shape. The present embodiment thus reduces the number of gradations having a small distance between dots compared with a halftone dot shape technique, which is the conventional dot screen growth method.

The dot block forming unit 200 according to the present embodiment forms the halftone dot shape until the distance between the dot blocks db decreases to 50 μm, for example. Subsequently, the void image forming unit 201 forms the bridges dk. After the formation of the bridges dk, the void image forming unit 201 switches to formation of the void halftone dot portions ws.

During the shift from formation of the halftone dot shape to formation of the void halftone dot portions ws, however, the distance between the dot blocks db decreases, thereby deteriorating the image stability. As described above, banding is one of abnormal images (image defects) generated in electrophotographic image forming apparatuses. Banding is most conspicuous when the input area rate indicating the ratio of black to white of dot images is substantially 50% (refer to FIG. 19). If the void image forming unit 201 forms the void halftone dot portions ws near this gradation region, banding conspicuously occurs. To suppress the banding, the void image forming unit 201 finishes forming the void halftone dot portions ws before the input area rate reaches 40% at which the banding starts to be conspicuous.

The following describes dot growth that can secure the toner adhesion stability in any gradation. In the electrophotographic technology, the toner adhesion stability tends to increase as the number of dot images around a dot image of interest increases. The toner adhesion stability significantly varies especially depending on whether three or more dots are present around a newly arranged dot image. A specific example is illustrated in FIGS. 8A to 8C.

FIGS. 8A to 8C are diagrams for explaining an example of processing for dot growth according to the present embodiment. FIGS. 8A to 8C illustrate processing performed on the dot blocks db. FIG. 8A illustrates appropriate processing serving as a good example, FIG. 8B illustrates inappropriate processing serving as an NG example, and FIG. 8C illustrates an example of an exception.

The dot block forming unit 200 performs growth processing on the dot blocks db as illustrated in FIG. 8A. In FIGS. 8A to 8C, dn denotes a newly arranged dot image (one dot), and ds denotes a contact dot in contact with the dot block db.

When adding a new dot image dn in contact with the dot block db as illustrated in FIG. 8A, the dot block forming unit 200 forms the dot block db such that the new dot image dn is in contact with the dot block db in three or more directions out of eight directions around the dot image dn (refer to ds in FIG. 8A). The dot block forming unit 200 grows the dot block db such that adjacent dot images are in contact with each other in three or more directions out of the eight directions around the dot images in as many gradations as possible.

In the electrophotography, an unstable weak electric field that causes toner to sometimes adhere and sometimes not is generated around the toner on the photoconductor. The magnitude of the weak electric field increases to a magnitude that enables the toner to stably adhere as the number of adjacent dot images increases, thereby making adhesion of the toner stable. The increased toner adhesion stability in the dot images can improve the image quality, such as the color stability and the granularity, in the image in all the gradations.

By performing the growth process of the dot images illustrated in FIG. 8A, the dot block forming unit 200 can increase the toner adhesion stability in any gradation. As a result, the dot block forming unit 200 can improve the image quality and the stability of the image quality in the gradation image.

By contrast, the newly arranged dot image dn in FIG. 8B is not in contact with the dot block db in the eight directions around the dot image dn unlike the example in FIG. 8A. The example in FIG. 8B is inappropriate for the growth processing of the dot images for increasing the toner adhesion stability.

In FIG. 8C, whichever position the dot image dn is arranged at, the dot image dn is in contact with adjacent dots only in two directions out of the eight directions around the dot image dn. In such a case where the gradation value is extremely small, for example, the condition illustrated in FIG. 8A is not satisfied.

FIG. 9 is a diagram for explaining an example of a method for growing dots until the distance between dots decreases to 50 μm or less. The dot block forming unit 200 grows the dot blocks db using the conventional method for forming the halftone dot shape until the distance between dots decreases to 50 μm from the state illustrated in the upper left figure in FIG. 9 in order. In a case where the resolution is 600 dots per inch (dpi), for example, the size of one dot is substantially 42 μm. In this case, the dot block forming unit 200 forms the dot blocks db until the distance between dots corresponds to one dot. In a case where the resolution is 1200 dpi, the size of one dot is substantially 21 μm. In this case, the dot block forming unit 200 forms the dot blocks db in the conventional halftone dot shape until the distance between dots corresponds to two dots.

During the shift from formation of the halftone dot shape to formation of the void halftone dot portions ws, the distance between the dot blocks db decreases. As a result, the image stability is likely to deteriorate. To reduce the number of gradations in which the image quality and the stability of the image quality deteriorate, it is necessary to quickly complete the shift to the void halftone dot shape. To quickly complete the shift, a bridge structure illustrated in FIG. 10 is used.

Figure 10:
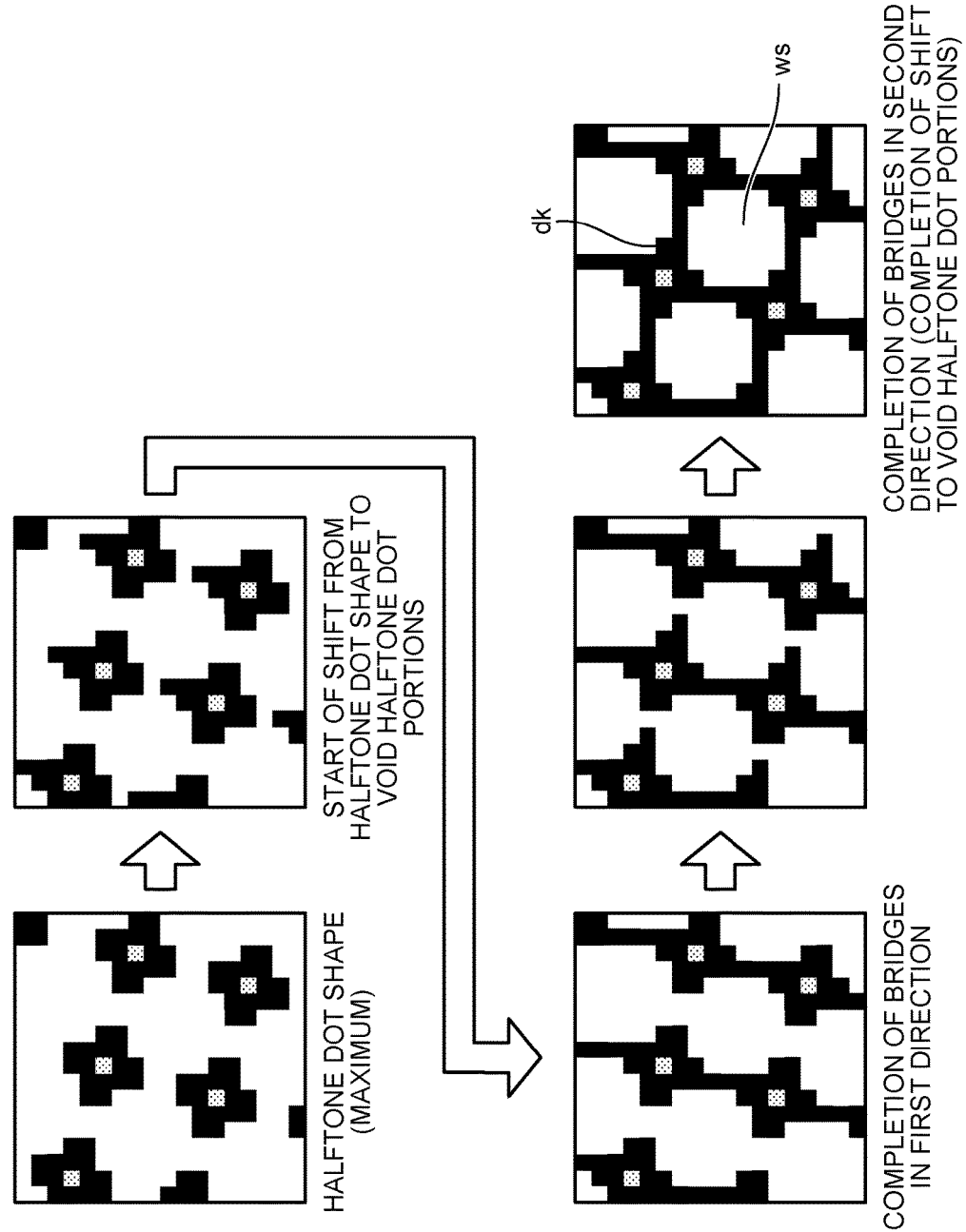
FIG. 10 is a diagram for explaining an example of the method for growing dots from the halftone dot shape to the void halftone dot shape.
Figure 11:
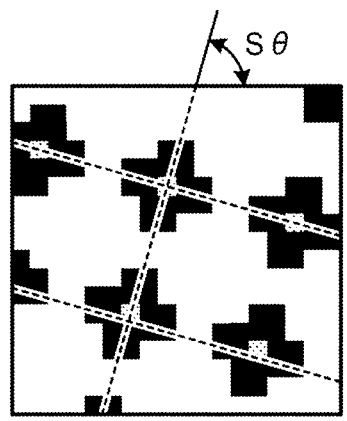
FIG. 11 is a diagram for explaining a relation between the halftone dot shape and a screen angle.

FIG. 10 is a diagram for explaining an example of the method for growing dots from the halftone dot shape to the void halftone dot portions ws. FIG. 11 is a diagram for explaining a relation between the halftone dot shape and a screen angle. As illustrated in FIG. 11, the dot screen has screen angles, due to the nature thereof, in two directions of a direction having a larger screen angle Sθ and a direction having a smaller screen angle Sθ. The bridge structure is formed in the direction having the larger screen angle first. As illustrated in FIG. 11, a shape similar to the line screen shape is formed when the bridges dk in the first direction are completed. This is because the image stability in the line screen increases as the screen angle increases. After the bridges dk in the direction having the larger screen angle are completed, the bridges dk in the direction having the smaller screen angle are completed. As a result, the shift to the void halftone dot regions ws is completed.

In the example illustrated in FIG. 10, when the halftone dot shape is maximum, the shift from formation of the halftone dot shape to formation of the void halftone dot portions ws is started. Subsequently, the bridges dk in the first direction are first completed, and the bridges dk in the second direction are then completed. As a result, the formation of the void halftone dot regions ws is completed. The present embodiment performs the formation of the bridges dk as described below.

Figure 12:
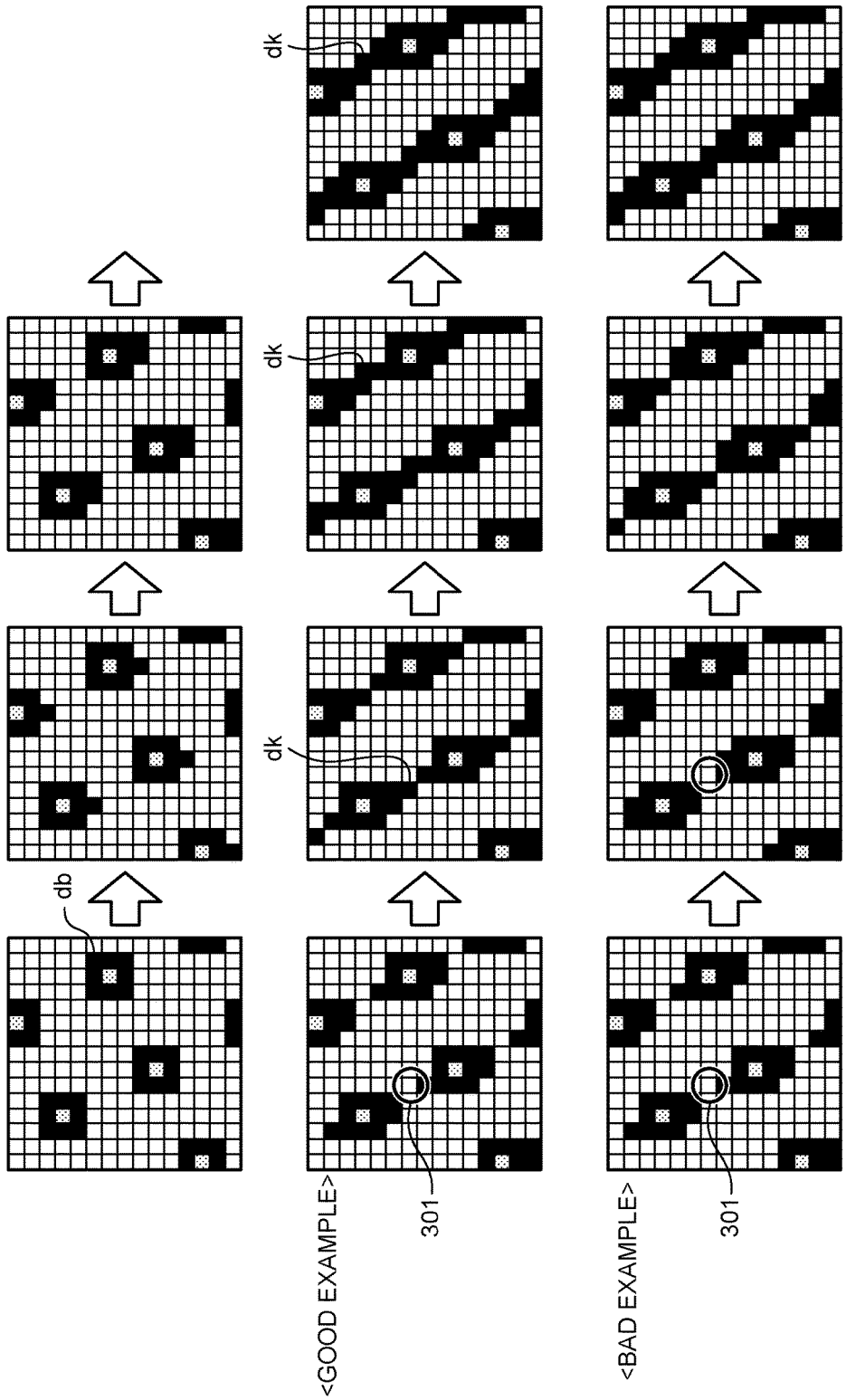
FIG. 12 is a diagram for explaining an example of an order of dot growth in a bridge according to the present embodiment.

FIG. 12 is a diagram for explaining an example of the order of dot growth performed by the void image forming unit 201. FIG. 12 illustrates formation of the bridges dk, including appropriate screen processing serving as a good example and inappropriate screen processing serving as a bad example.

Just before the bridges dk are connected, that is, in a state where the bridges dk are to be completed by one more dot as indicated by the circle 301 in FIG. 12, the toner adhesion state deteriorates. As a result, the image quality and the stability of the image quality deteriorate. If the bridges dk are not connected immediately in the subsequent gradation as illustrated in the good example, the poor toner adhesion state is maintained until the bridges dk are connected, resulting in deterioration of the image quality and the stability of the image quality.

To make the banding inconspicuous, the void image forming unit 201 forms the void halftone dot portions ws until the input area rate reaches 40%. In the formation, the void image forming unit 201 needs to form the void halftone dot portions ws with thin bridges dk depending on the number of screen lines and the screen angle. An example is illustrated in FIG. 13.

Figure 13:
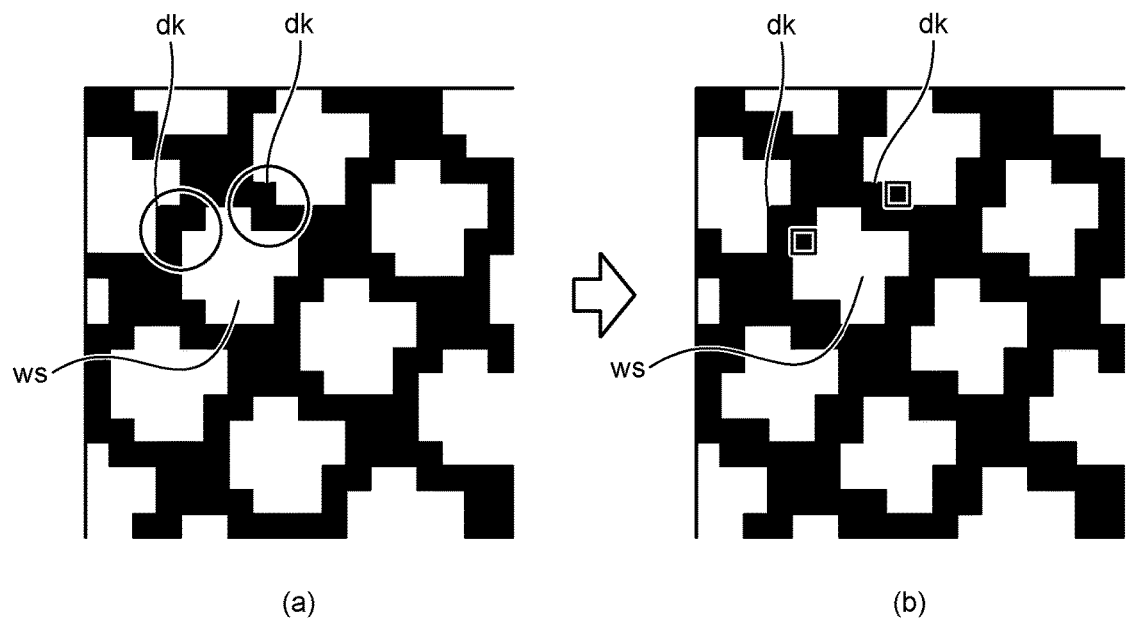
FIG. 13 is a diagram for explaining a state created immediately after void halftone dot portions are formed by bridges in two different directions according to the present embodiment.

FIG. 13 is a diagram for explaining a state created immediately after the void halftone dot portions ws are formed by the bridges dk in two different directions. At (a) in FIG. 13, the bridges dk are formed by lines with a width of one dot (portions surrounded by the circles at (a) in FIG. 13). If the bridges dk in both of the two directions if formed by lines with a width of one dot, adhesion of toner in the bridges dk is unstable.

Therefore, as illustrated at (b) in FIG. 13, the void image forming unit 201 grows the void halftone dot portions ws such that the bridges dk serving as the circumference of the void halftone dot portions ws are formed by lines with a width of one dot. As described above, if the bridges dk in the two directions serving as the circumference of the void halftone dot portions ws includes a line with a width less than two dots, the void image forming unit 201 forms the dot images such that the bridges dk are formed by lines with a width of two or more dots. The formation is indicated by the squares at (b) in FIG. 13 (corresponding to the portions surrounded by the circles at (a) in FIG. 13). This forming method can prevent deterioration of the toner adhesion stability after the void halftone dot portions ws are formed, thereby improving the image quality and the stability of the image quality.

Figure 14:
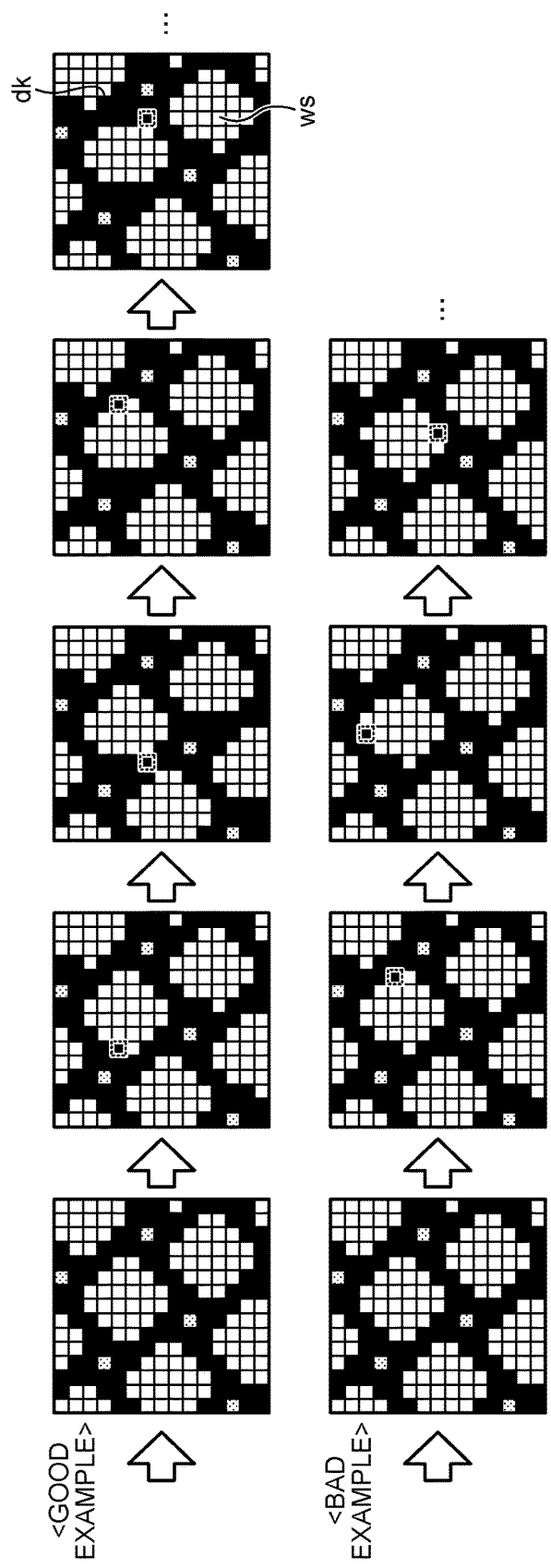
FIG. 14 is a diagram for explaining an example of an order of dot growth in the void halftone dot shape formed by the bridges in the two different directions according to the present embodiment.

FIG. 14 illustrates dot growth in the void halftone dot portions ws formed by the bridges dk in the two different directions. FIG. 14 illustrates a growth method of the void halftone dot portions ws in which the protrusions include two dots. The upper figures in FIG. 14 illustrate an example of appropriate growth (good example), whereas the lower figures in FIG. 14 illustrate an example of inappropriate growth (bad example).

In electrophotography, adhesion of toner is unstable when the distance between the dot blocks db falls below approximately 50 μm as described above. In a case where the resolution is 1200 dpi, for example, protrusions of one dot makes adhesion of toner unstable in the region.

Therefore, as illustrated in the upper figures in FIG. 14, the void image forming unit 201 grows the dots so as to reduce the gradation of the protrusions having a small distance between the dot blocks db as much as possible. This function can improve the image quality and the stability in the void halftone dot portions ws.

Figure 15:
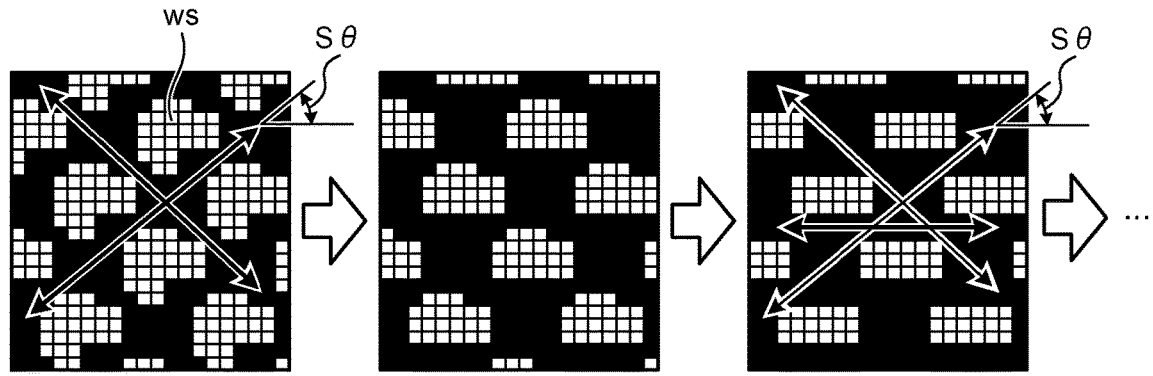
FIG. 15 is a diagram for explaining an inappropriate example (NG example) in which the void halftone dot portions are formed such that dot images are linearly arranged in a main-scanning direction.
Figure 16:
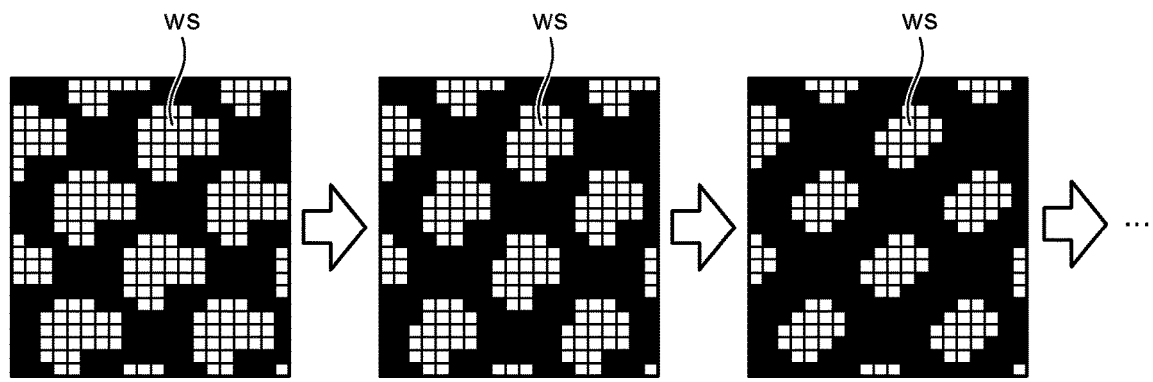
FIG. 16 is a diagram for explaining an appropriate example (good example) in which the void halftone dot portions are formed such that the dot images are linearly arranged in the main-scanning direction.

FIGS. 15 and 16 are diagrams for explaining examples in which the void halftone dot portions ws are formed such that dot images are linearly arranged in a main-scanning direction. FIG. 15 illustrates an inappropriate example (bad example) of arrangement of the dot images. FIG. 16 illustrates an appropriate example (good example) of arrangement of the dot images.

If dot images are linearly arranged in the main-scanning direction, and the void halftone dot portions ws are grown as illustrated in FIG. 15, the screen angle Sθ of the screen image fails to be effectively used. Furthermore, the screen image illustrated in FIG. 15 is significantly affected by a screen angle of 0, which provides a low degree of stability of the image quality.

To avoid forming the shape illustrated in FIG. 15, the void image forming unit 201 forms the void halftone dot portions ws along the screen angle Sθ. In other words, the void image forming unit 201 forms the void halftone dot portions ws along the screen angle Sθ as illustrated in FIG. 16. This function prevents deterioration of the toner adhesion stability in the void halftone dot portions ws, thereby improving the image quality and the stability of the image quality. As described above, when growing the dot images so as to fill the void halftone dot portions ws, the void image forming unit 201 prevents the dot images from being linearly arranged in the main-scanning direction.

Figure 17:
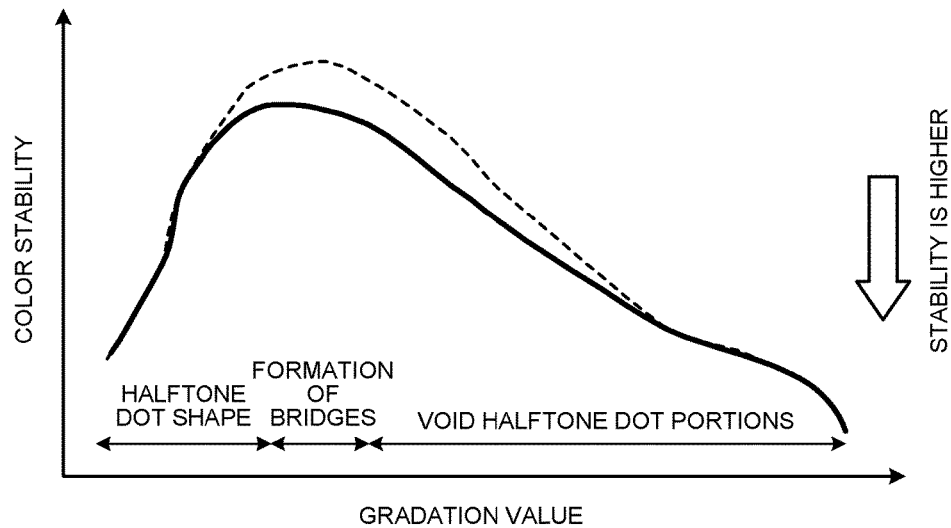
FIG. 17 is a graph of the image stability in the conventional halftone dot screen processing and the halftone dot screen processing according to the present embodiment.

FIG. 17 is an exemplary graph illustrating difference in the image stability between the conventional halftone dot screen and the halftone dot screen according to the present embodiment with the image quality and the stability. The vertical axis in FIG. 17 represents the color stability. As illustrated in FIG. 17, the conventional halftone dot screen (graph indicated by the broken line) has a problem in the color stability in the intermediate gradation. By contrast, the screen according to the present embodiment (graph indicated by the solid line) includes the following growth pattern of three stages: formation of the halftone dot shape, formation of the bridges dk for shifting from formation of the halftone dot shape to formation of the void halftone dot shape, and formation of the void halftone dot shape. As illustrated in FIG. 17, the halftone dot screen according to the present embodiment has improved color stability in the intermediate gradation compared with the conventional halftone dot screen by employing the growth method for the bridges dk and the void halftone dot portions ws described above.

The computer program executed by the image processing apparatus in the embodiment is embedded and provided in the ROM 111, for example. The computer program may be recorded and provided in a computer-readable recording medium such as a compact disc read only memory (CD-ROM), a flexible disk (FD), a compact disc recordable (CD-R), and a digital versatile disc (DVD), as an installable or executable file.

The computer program executed in the embodiment may be stored in a computer connected to a network such as the Internet and downloaded via the network to provide the computer program. The computer program executed in the embodiment may be provided or distributed via a network such as the Internet.

The computer program executed in the embodiment has a module structure that includes the respective units described above. In practical hardware, the CPU (processor) 110 reads out the computer program from the ROM 111 and executes the program, so that the units are loaded into a main storage unit, and the units are formed in the main storage unit.

An embodiment can improve the image stability of a halftone dot screen image in intermediate gradation.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image processing apparatus comprising:
an image determining unit configured to determine a gradation value for each predetermined range in input image data; and
a screen generator configured to arrange dot images around a plurality of growth centers in a halftone dot screen to form respective dot blocks if an input area rate indicating a ratio of black to white in dot images at the gradation value is smaller than a value at which an image defect occurs, and form bridges to connect adjacent dot blocks during a smallest gradation number if distances between the adjacent dot blocks decrease to a predetermined value or less along with growth of the dot blocks, to form a void halftone dot image.

2. The image processing apparatus according to claim 1, wherein
the screen generator comprises:
a dot block forming unit configured to form the dot blocks such that, if adding a new dot image in contact with a dot block, the new dot image is in contact with a predetermined number or more of dots of the dot block in all directions around the dot image;
a void image forming unit configured to form the bridges to connect the adjacent dot blocks during the smallest gradation number, to form the void halftone dot image, if the dot blocks are grown by the dot block forming unit, and the distances between the adjacent dot blocks decrease to the predetermined value or less; and a dot image forming unit configured to fill a void portion included in the void halftone dot image with dot images after formation of the void halftone dot image is completed.

3. The image processing apparatus according to claim 2, wherein the dot block forming unit is configured to add the new dot image so as to be in contact with the dot block in three or more directions out of eight directions around the dot image.

4. The image processing apparatus according to claim 2, wherein the void image forming unit is configured to form, if bridges in two directions serving as a circumference of the void halftone dot image includes a line with a width less than two dots, one or more dot images such that the bridges are formed by lines with a width of two or more dots.

5. The image processing apparatus according to claim 2, wherein the void image forming unit is configured to form the void halftone dot image along screen angles of the halftone dot screen.

6. The image processing apparatus according to claim 1, wherein the predetermined value of the distances between the dot blocks is 50 μm.

7. The image processing apparatus according to claim 2, wherein the void image forming unit is configured to form dot images such that a gradation number during which a protrusion of the void halftone dot image has a minor axis of 50 μm is smallest.

8. The image processing apparatus according to claim 1, wherein the predetermined value of the distances between the dot blocks is 50 μm, the input area rate is equal to or lower than 40%, and the void halftone dot image is a halftone dot screen of 40% or more.

9. The image processing apparatus according to claim 2, wherein the void image forming unit is configured to form bridges in a direction having a larger screen angle of the halftone dot screen first if forming the bridges in the halftone dot screen to form the void halftone dot image.

10. An image processing method comprising:
determining a gradation value for each predetermined range in input image data; and
arranging dot images around a plurality of growth centers in a halftone dot screen to form respective dot blocks if an input area rate indicating a ratio of black to white in dot images at the gradation value is smaller than a value at which an image defect occurs, and forming bridges to connect adjacent dot blocks during a smallest gradation number if distances between the adjacent dot blocks decrease to a predetermined value or less along with growth of the dot block, to form a void halftone dot image.

11. A non-transitory recording medium including a computer program causing a computer to execute:
determining a gradation value for each predetermined range in input image data; and
arranging dot images around a plurality of growth centers in a halftone dot screen to form respective dot blocks if an input area rate indicating a ratio of black to white in dot images at the gradation value is smaller than a value at which an image defect occurs, and forming bridges to connect adjacent dot blocks during a smallest gradation number if distances between the adjacent dot blocks decrease to a predetermined value or less along with growth of the dot blocks, to form a void halftone dot image.

* * * * *